Nov. 1, 1927.

C. FIRPO

PORTABLE APPARATUS FOR PRODUCING AND APPLYING ELECTRIC
CURRENTS FOR THERAPEUTIC PURPOSES

Filed Feb. 21, 1923

INVENTOR.
C. Firpo
BY
ATTORNEYS.

Patented Nov. 1, 1927.

1,647,691

UNITED STATES PATENT OFFICE.

COSTANTINO FIRPO, OF GENOA, ITALY.

PORTABLE APPARATUS FOR PRODUCING AND APPLYING ELECTRIC CURRENTS FOR THERAPEUTIC PURPOSES.

Application filed February 21, 1923, Serial No. 620,481, and in Italy July 24, 1922.

This invention has for its object to provide an improved portable apparatus for producing and applying electric currents of high or low frequencies and high voltages.

This improved portable apparatus serves for therapeutical purposes and more particularly for the treatment of diseases of infection and assimilation material or organic elaboration or metabolism.

This improved portable apparatus may be worked with direct current or with alternating current; it can be easily and simply worked from domestic electric installations, and it comprises essentially an electrolytic interrupter, a static transformer and a conducting blanket connected to one pole only of the apparatus.

The said blanket which contains a service circuit, is designed to be spread over the body of the patient.

The static transformer is characterized by the feature that one of the poles of the primary winding is connected directly to a pole of the secondary winding, thereby producing resonance and consequently a generation of current under conditions which are the most advantageous for the purpose for which the improved apparatus is designed to be used.

The improved apparatus is designed to be connected to two poles of the supply circuit. The pole of the secondary winding of the transformer not connected to the primary circuit is connected to one end of an electric conductor contained in an "electric blanket" composed preferably of two waxed cloths of a length and width corresponding to the dimensions of the bed on which the patient is to be treated. These waxed cloths are stuck and sewn together, and between them is the aforesaid conductor of ample cross section and suitable length, well insulated and folded or in a zig zag or Greek key fashion.

The improved apparatus may be used either with direct current or with alternating current. In the first case the current is admitted periodically by an electrolytic interrupter or by a rotary converter. In the second case the current is connected directly to the transformer. In addition to the fundamental characteristic features of the improved apparatus as hereinbefore set forth, various secondary devices may be provided for helping in the attainment of a more regular and more complete operation of the improved apparatus; such devices are for instance, as follows:—A time-interrupter designed to suspend for determined periods the flow of the current through the aforesaid electrolytic interrupter, and having for its object to prevent any excessive heat in the latter.

Two condenser capacities connected in parallel to the secondary and connected to each other in such a manner that their internal armatures are connected to the inner pole of the secondary winding of the static transformer, and also to the other poles of the service circuit.

When under these conditions it is desired to have a current of very high voltage and high frequency, a normal sparking device must be interposed in series between the two internal armatures, and the outer armatures must be connected to the "electric blanket" which is to be spread over the patient. But if on the contrary, under the aforesaid conditions it is desired to obtain current of low frequency, it will be sufficient to disconnect the said sparking device and in its stead to connect the secondary winding of the static transformer to the "electric blanket".

When the apparatus is worked with direct current it is advisable to employ an indicator of polarity for the electrolytic interrupter, this indicator being connected in series with the latter. In any case the high voltage current of the secondary winding passes through the "electric blanket" in the form of a series of small discharges, passes through the patient, the bed, and thence to earth, for which reason it is absolutely necessary that no one shall touch or approach the patient while he is being treated on the bed under the electric blanket.

The improved apparatus when arranged to be worked with low frequency current (that is to say, without the aforesaid capacities, or condensers, sparking device, etc.) may also be used, by means of the electrolytic interrupter for radiographic purposes. As a matter of fact the two ends of the secondary winding may be connected to an apparatus for the production of X-rays.

The nature of this invention will be more fully understood by reference to the accompanying diagrammatic drawings which illustrate the construction and working of the improved apparatus.

In these drawings:

Figure 3 illustrates a preferred form of the "electric blanket" to be spread over the patient, and Figure 4 is a diagram illustrating the arrangement of the improved apparatus for use with alternating current, either for ensuring that the current acting upon the patient shall be of high frequency and very high voltage or shall have a low frequency.

As shown, the static transformer comprises two windings, namely, a primary winding 1 and a secondary winding 2, connected together at the point 3 to constitute one common pole.

Figure 1:
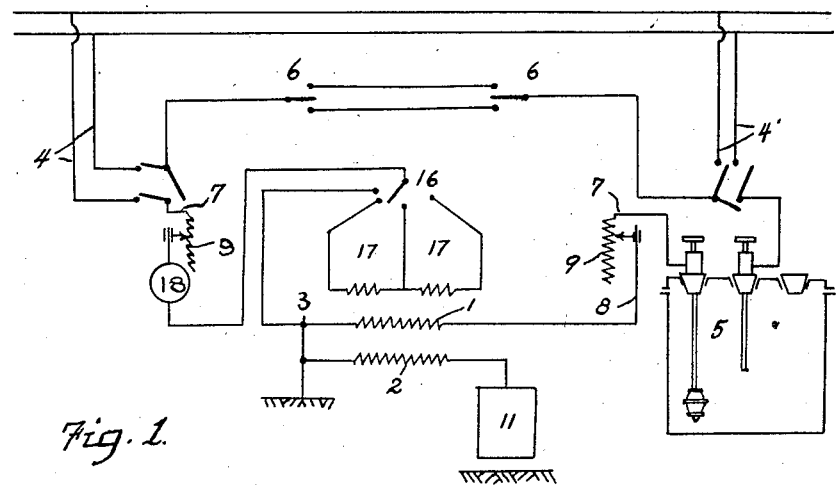
Figure 1 illustrates the arrangement of the improved apparatus for use with direct current.

Referring more particularly to Figure 1 which illustrates the use of direct current, the improved apparatus is provided, for the purpose of great convenience in use, with two connections for receiving current from external current supply circuits namely one at 4 and the other at 4'. The improved apparatus is connected at one end to one of these current supplies (for instance, the current supply circuit 4), and at its other end 4' to an electrolytic interrupter 5 which completes the circuit.

The current coming from the external supply circuit 4 passes through the conductor 7 and through the conductor 8 and the adjustable ohmic resistance 9, thence the current passes to the common junction 3 of the primary winding 1 and the secondary winding 2 of the transformer by means of a device for the variation of frequency comprising an inductance coil 16, 17.

At the point 3 the current follows two paths, namely one path along the primary winding 1, flowing through the conductor 8' and the right-hand ohmic resistance 9'. Thence it flows to the electrolytic interrupter 5 and from the latter it returns through the lead 4 to the external circuit.

The second portion of the current branching off at the point 3 traverses the secondary winding 2, the other pole 10 of this secondary winding, and through a lead 15 which is connected by means of clamp terminals 14 to the blanket 11. The latter contains a conductor 13 between the two waxed cloths 12. 18 is an amperemeter for indicating the strength of the current employed.

Figure 2:
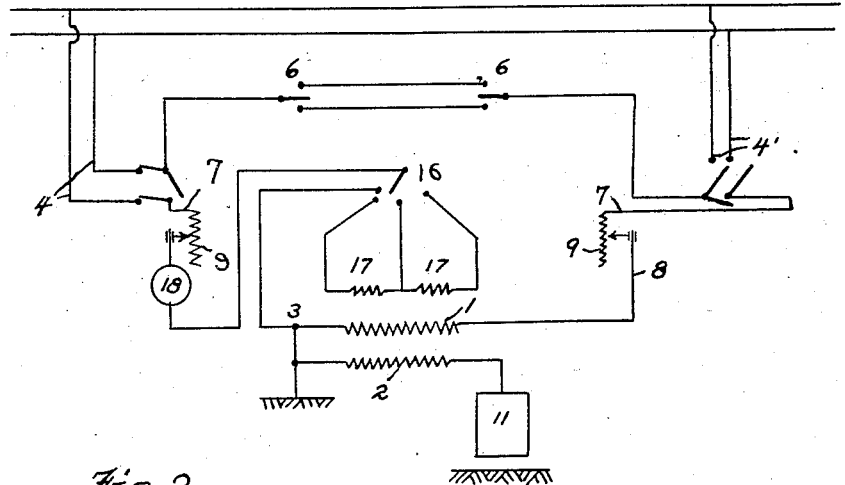
Figure 2 illustrates the arrangement of the improved apparatus for use with alternating current.

Figure 2 illustrates an arrangement for the use of alternating current; in this case the electrolytic interrupter is omitted, all the remainder of the apparatus is identical with the arrangement just before described.

If the external current is introduced into the apparatus through the terminals 4 the circuit must be completed by means of a contact plug connected to the terminals 4' and vice versa.

If alternating current is available, and it should be required to modify its voltage and frequency while increasing it considerably, an arrangement may be employed such as that shown in Figure 4. This arrangement comprises, in addition to the characteristic features hereinbefore described, two condenser capacities whose outer armatures 19 are connected together by means of the conductor 20. These armatures are connected to the "electric blanket" 11 which is to be spread over the patient. One of the internal armatures of these capacities, for instance the armature 21, is connected to the junction 3 of the primary and secondary windings of the static transformer. To the junction 3 and to the other internal armature 22 of the second capacity, there are connected two electrodes of a sparking device 25 which will produce oscillatory discharges of high frequency. The adjustment of the said discharges is effected by suitably adjusting the distance between the electrodes of the said device. On the contrary, while having alternate current at one's disposal, if it should be desired to get a current of low frequency and high voltage for the purpose of sending it into the blanket to be spread over the patient, it will be sufficient to omit the sparking device from the apparatus shown in Figure 4 and to connect the end 23 of the secondary winding to the blanket 11 by means of the conductor 24, whilst placing the conductor 20 out of operation.

It is to be understood that many other modifications may be made in the improved apparatus as hereinbefore described and shown, with the object of obtaining various degrees of charge or of producing other secondary phenomena such as for instance, producing Roentgen rays by direct utilization, for this purpose, of the windings of the transformer etc., so long as all these modifications are based upon the fundamental principles of the present invention.

Having now particularly described and ascertained the nature of my said invention and in what manner the same is to be performed, I declare that what I claim is:

1. In a portable apparatus for producing currents of low frequency and high voltage for therapeutic purposes, the combination with a static transformer including primary and secondary windings, one end of each of the primary and secondary windings being connected together, a circuit including the primary windings, adjustable resistances interposed in said circuit, an insulating blanket adapted to be applied to a patient undergoing treatment, an electrode arranged in the blanket, means connecting the electrode with the end of the secondary winding opposite that connected with the primary winding whereby alternative charges of static electricity are induced from the blanket to the earth, discharging through the patient's body.

2. In a portable apparatus for producing currents of low frequency and high voltage for therapeutic purposes, the combination of a static transformer including primary and secondary windings, a circuit including the primary winding, an electrolytic interrupter interposed in said circuit, one end each of the primary and secondary winding being connected together, adjustable resistances interposed in said circuit, an insulating blanket adapted to be spread over a patient to be treated, an electrode located in said blanket, and means connecting said electrode with the end of the secondary winding opposite that connected with the primary winding whereby alternative charges of static electricity are induced from the blanket to the earth, discharging through the patient's body.

3. In a portable apparatus for producing currents of low frequency and high voltage for therapeutic purposes, the combination with alternating current circuit, a static transformer interposed in said circuit and including primary and secondary windings, the primary winding being connected in said circuit and one end each of the primary and secondary windings being connected together, adjustable resistances interposed in said circuit, an insulating blanket adapted to be spread over a patient undergoing treatment, an electrode located in said blanket, two capacities including inner armatures connected to the poles of the secondary winding and outer armatures connected to each other provided with means for connecting the apparatus to the blanket electrode, and a normal oscillator arranged as a shunt to the secondary winding.

In testimony whereof I have signed my name to this specification.

COSTANTINO FIRPO.